Sept. 8, 1936. E. CULVER ET AL 2,053,551
MULTIFOCAL LENS AND METHOD OF MAKING THE SAME
Filed July 9, 1934 2 Sheets-Sheet 1
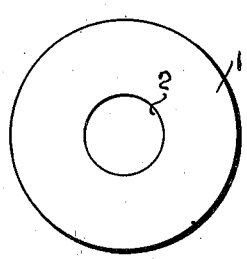
Fig. 1.
Fig. 2.
Fig. 3.
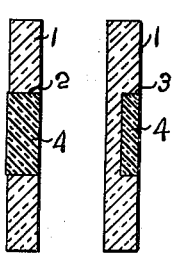
Fig. 4. Fig. 5.
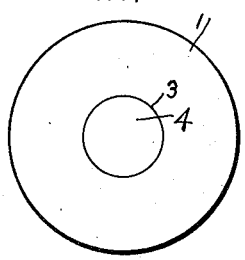
Fig. 6.
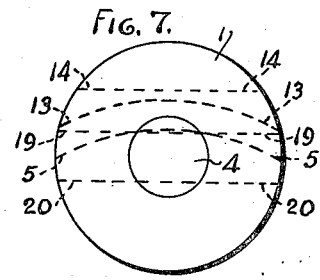
Fig. 7.
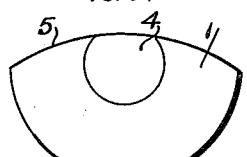
Fig. 8.
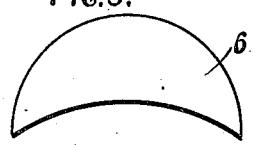
Fig. 9.
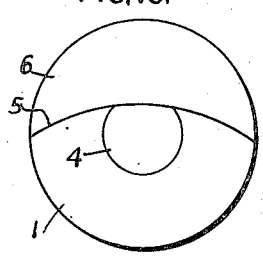
Fig. 10.
Fig. 11.
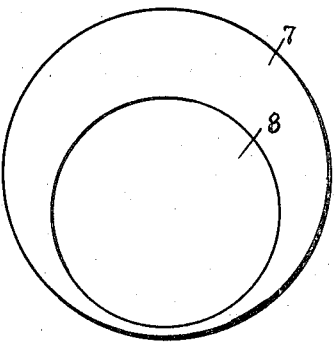
Fig. 12.
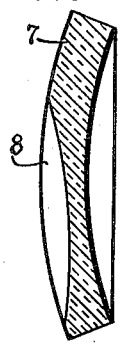
Fig. 13.
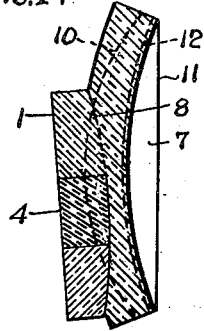
Fig. 14.
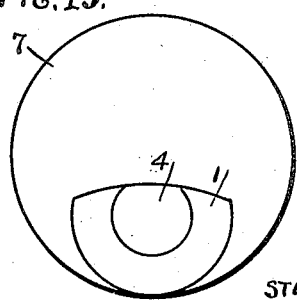
Fig. 15.
Inventors
EDWARD CULVER,
STANLEY ALFRED EMERSON,
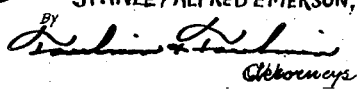
Attorneys

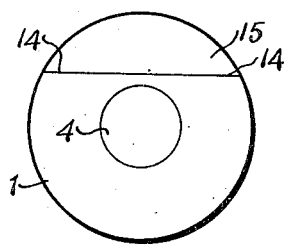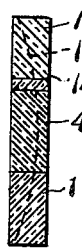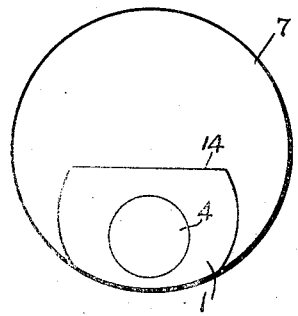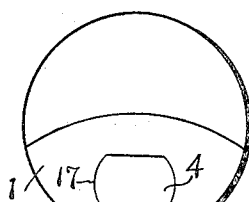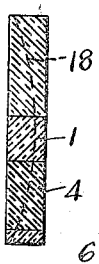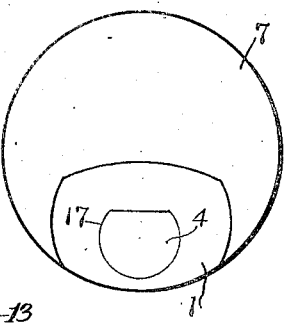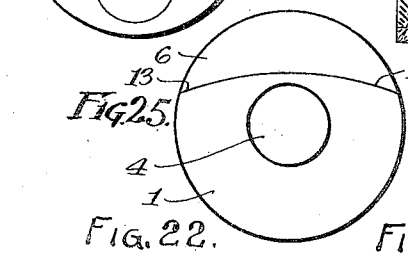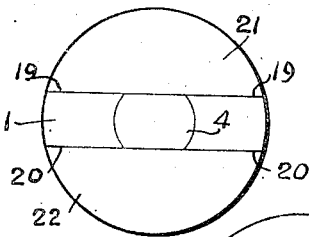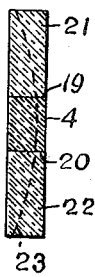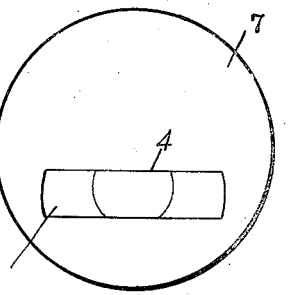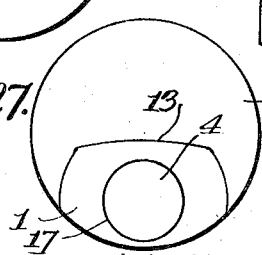

Patented Sept. 8, 1936

2,053,551

UNITED STATES PATENT OFFICE 2,053,551

MULTIFOCAL LENS AND METHOD OF MAKING THE SAME

Edward Culver and Stanley Alfred Emerson, London, England, assignors to United Kingdom Optical Company, Limited, London, England Application July 9, 1934, Serial No. 734,240 In Great Britain March 3, 1934

3 Claims. (Cl. 88—54)

This invention relates to multifocal lenses, and in particular to trifocal lenses made of different kinds of glass united by fusing; also to methods of making such lenses.

One object of our invention is to provide a trifocal lens composed of a plurality of different kinds of glass and having a segment wherein the reading portion and the intermediate portion are bounded by dividing lines of different outline.

Another object is to provide a fused trifocal lens wherein the reading portion is surrounded, either wholly or partially, by the intermediate portion, these two portions being contained in a single countersink within the major portion of the lens.

Another object is to provide a trifocal lens having a countersink of single curvature, and a compound insert within this countersink; and composed of glasses which differ in refractive index from each other and from the glass of the major portion of the lens.

Another object is to provide a method of making a trifocal lens wherein a hole or socket is formed in a carrier button of an intermediate index glass; a high index segment secured in this socket or hole, as by fusing; this button being cut away along its edge portions, and pieces of the major portion glass substituted for the cut-away pieces; and the compound button thus formed fused into a countersink in the major portion of the lens.

In the drawings:

Figure 1 is a front elevation of a button having a hole or socket formed therein;

Figure 2 is a central vertical section through the button shown in Figure 1, wherein the hole passes entirely through the button;

Figure 3 is a central vertical section through the button in Figure 1, wherein the socket passes but part-way through the button;

Figure 4 is a central vertical section through the button of Figure 2, after a portion of higher index glass has been secured in the hole;

Figure 5 is a central vertical section through the button of Figure 3 with a higher index segment portion secured in the socket;

Figure 6 is a front elevation of the button shown in Figures 4 and 5;

Figure 7 is a diagrammatic view of the button shown in Figure 6, illustrating different ways of cutting the button to produce different shapes of segment;

Figure 8 is a front elevation of the button shown in Figure 4 or 5 after the edge portion has been cut away;

Figure 9 is a front elevation of a piece of major portion glass cut so as to be substituted for the portion of intermediate index glass cut away from the button shown in Figure 8;

Figure 10 is a front view of the button parts shown in Figures 8 and 9 after being united;

Figure 11 is a central vertical section through the compound button shown in Figure 10;

Figure 12 is a front elevation of a major portion or major blank, with a countersink adapted to receive the compound button;

Figure 13 is a central vertical section through a major blank shown in Figure 12;

Figure 14 is a central vertical section through the major blank shown in Figure 12 after the compound button of Figures 10 and 11 has been fused into the countersink thereof;

Figure 15 is a front view of the completed lens;

Figure 16 is a view of a compound button of modified shape;

Figure 17 is a central vertical section through the button shown in Figure 16;

Figure 18 is a front elevation of the completed lens made by fusing the button of Figures 16 and 17 into the countersink shown in Figure 12;

Figure 19 is a front elevation of a compound button having a socket or hole of non-circular shape;

Figure 20 is a central vertical section through the button of Figure 19;

Figure 21 is a front elevation of the completed lens made from the button of Figures 19 and 20;

Figure 22 is a front elevation of a modified form of a compound button;

Figure 23 is a central vertical section through the button of Figure 22;

Figure 24 is a front elevation of the completed lens made from the compound button of Figures 22 and 23;

Figure 25 is a front elevation of a button as cut along the line 13—13 of Figure 7;

Figure 26 is a central vertical section through the button of Figure 25;

Figure 27 is a front elevation of the completed lens made from the button of Figures 25 and 26.

Referring to the drawings in detail, Figure 1 shows a button 1 composed of glass of an intermediate index of refraction, that is, an index of refraction higher than that normally employed for distance lenses. Formed in the button 1 is a hole 2 (Figure 2) or socket 3 (Figure 3). This hole or socket is preferably formed during the molding process, as by punching the same with a suitably formed puncher while the glass is in a plastic condition.

After the hole 2 or socket 3 has been formed in the button 1, a block 4 of a higher index of refraction is fused into the socket or hole. This block is of an index of refraction ordinarily used for the reading portions of bifocal lenses.

The edge of the button thus formed is then cut away, as at 5, (Figures 7 and 8) in such a manner as to remove a part of the intermediate index glass. A suitably formed portion 6 of low index glass, such as is ordinarily used for distance lenses and distance portions of bifocal lenses, is then united edge-to-edge with the cutaway button of Figure 8, producing the compound button shown in Figures 10 and 11.

A major blank 7 of low index glass such as is ordinarily used for the distance portions of bifocal lenses is then provided with a countersink 8 of a single curvature throughout. The compound button of Figures 10 and 11 is then surfaced with a suitable curvature, such as is shown by the dotted line 9 (Figure 11), and is then fused into the countersink 8, with the result shown in Figure 14.

The rough blank thus formed (Figure 14) is then surfaced to a common surface curvature on the button surface of the blank, such as down to the level indicated by the dotted line 10 (Figure 14). This produces a semi-finished blank wherein the rear surface 11 may be given any suitable power or curvature in accordance with the prescription of the wearer. This curvature is indicated by the dotted line 12 in Figure 14. This operation of surfacing the rear surface of the lens produces the finished lens shown in Figure 15.

As shown in Figure 7, different arrangements of the reading portion 4 within the intermediate button 1 may be produced by cutting away the edge portion in different manners. Some of these ways are indicated by the dotted lines in Figure 7. By cutting away the button along the dotted line 13—13, for example, the button shown in Figs. 25 and 26 can be produced. This button is then worked and fused to a suitable countersink as before and after further surfacing the lens shown in Fig. 27 is obtained.

By cutting the button of Figure 7 along the line 14—14, and edge-uniting a piece of low index glass 15 thereto, the compound button shown in Figures 16 and 17 is produced. In this button, the reading portion 4 is spaced apart from the dividing line 14—14 between the intermediate portion 1 and the distance portion 15. The finished lens is obtained in the manner previously described by surfacing the button of Figure 17 to a suitable curve, as indicated by the dotted line 16, and then fusing this compound button into the countersink 8 in the major blank 7. This gives the finished lens shown in Figure 18.

In the modified form of lens shown in various stages of construction in Figures 19 to 21, a hole or socket having a non-circular dividing line 17 is formed in the intermediate button 1. A block 4 is then secured within the non-circular hole or socket in the manner previously described. The button is then surfaced to a suitable countersink curve, as indicated by the dotted line 18 in Figure 20, and then fused into a countersink 8 of a major blank 7, as set forth previously. The rough blank thus obtained, when surfaced on its opposite sides to appropriate curvatures, produces the finished lens shown in Figure 21.

The modified form of lens shown in Figure 24 is made by cutting away the button of Figure 7 along the lines 19—19 and 20—20. Pieces of low index major portion glass 21 and 22 are then substituted for the pieces of intermediate index glass cut away, the whole being fused together edge-to-edge. The compound button thus formed is likewise surfaced with a suitable countersink curve, as indicated by the dotted line 23 in Figure 23, and this finished button fused into the countersink 8 of a major blank 7. The rough blank obtained is analogous to that shown in Figure 14, and produces the finished lens shown in Figure 24 when the front and rear surfaces 10 and 12 are ground.

In this manner we have produced a trifocal lens wherein a minor insert of a compound nature is surrounded by the distance blank, this minor insert including glasses of refractive indices, differing both from the major blank 7 and from each other. By cutting the boundaries of this insert during the process of manufacture, the outline of the finished insert may be varied in any desired manner. When the compound button is fused into the countersink 8 of the major blank 7, the portion of the compound button, which is made of low index glass, disappears into the major portion, since it is of the similar kind of glass.

It will be seen that the amount and direction of the prism introduced by the reading insert may be varied by varying the position of this insert relative to the centre of the depression curve.

It will be obvious that a compound button can be made in the manner we have disclosed, wherein by cutting away portions of the button shown in Figure 6, and substituting portions of glass of yet another index of refraction, thus producing a quadrifocal lens. This could be accomplished, for example, by making the portion 21 or 22 in Figure 22 of an index of refraction different from that of the portion 4, the portion 1 and the major blank 7.

It will be understood that we desire to comprehend within our invention such modifications as may be necessary to adapt it to varying conditions and uses.

It will be further understood that the dividing line 17 is surrounded by a buried shoulder, resulting from the finite edge thickness of the portion 4 in the completed lens.

Having thus fully described our invention, what we claim as new and desire to secure by Letters Patent is:

1. The method of making a multifocal lens comprising forming a shouldered hole within glass of one index of refraction, fusing therein a piece of glass of another index of refraction, cutting away a part of the edge of the button thus formed, securing a piece of glass of a third index of refraction to the edge from which the cutaway part was removed, and fusing the compound button thus formed into a countersink in a major blank of the same index of refraction as said third index of refraction.

2. The method of making a multifocal lens comprising forming a shouldered hole within glass of one index of refraction, fusing therein a piece of glass of another index of refraction, cutting away a part of at least one of the edges of the button thus formed, securing a piece of glass of a third index of refraction to the edge from which the cut-away part was removed, and fusing the compound button thus formed into a countersink in a major blank of the same index of refraction as said third index of refraction.

3. The method of making a multifocal lens comprising forming a shouldered hole within glass of one index of refraction, fusing therein a piece of glass of another index of refraction, cutting away a part of at least one of the edges of the button thus formed, securing a piece of glass of a third index of refraction to said upper and lower edges from which the cut-away part was removed, and fusing the compound button thus formed into a countersink in a major blank of the same index of refraction as said third index of refraction.

EDWARD CULVER.
STANLEY A. EMERSON.